(12) United States Patent
Subramani et al.

(10) Patent No.: US 10,757,040 B2
(45) Date of Patent: Aug. 25, 2020

(54) EFFICIENT DISTRIBUTION OF PEER ZONE DATABASE IN FIBRE CHANNEL FABRIC

(71) Applicant: Cisco Technology, Inc., San Jose, CA (US)

(72) Inventors: Karthik Subramani, Karnataka (IN);
Venu Gopal Tummala, Karnataka (IN);
Kishan Kumar Kotari Uppunda, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 139 days.

(21) Appl. No.: 15/646,800

(22) Filed: Jul. 11, 2017

(65) Prior Publication Data

US 2019/0020603 A1 Jan. 17, 2019

(51) Int. Cl.
*H04L 12/931* (2013.01)
*H04L 12/24* (2006.01)
*G06F 3/06* (2006.01)
*H04L 29/06* (2006.01)
*H04L 12/947* (2013.01)
(Continued)

(52) U.S. Cl.
CPC .......... *H04L 49/357* (2013.01); *G06F 3/067* (2013.01); *G06F 3/0622* (2013.01); *G06F 3/0637* (2013.01); *H04L 12/28* (2013.01); *H04L 41/0813* (2013.01); *H04L 41/0893* (2013.01); *H04L 41/12* (2013.01); *H04L 45/02* (2013.01); *H04L 49/25* (2013.01); *H04L 63/101* (2013.01); *G06F 16/235* (2019.01); *H04L 41/0803* (2013.01); *H04L 67/1097* (2013.01)

(58) Field of Classification Search
CPC ....... H04L 49/357; H04L 12/28; H04L 49/25; H04L 45/02; G06F 17/30365
See application file for complete search history.

(56) References Cited

U.S. PATENT DOCUMENTS 8,208,479 B1 6/2012 DeSanti
9,565,050 B1 2/2017 Desanti
(Continued)

FOREIGN PATENT DOCUMENTS

EP 1755309 A2 2/2007

OTHER PUBLICATIONS

Innternational Search Report and Written Opinion in counterpart International Application No. PCT/US2018/040972, dated Sep. 28, 2018, 16 pages.
(Continued)

*Primary Examiner* — Ajit Patel
*Assistant Examiner* — Wilfred Thomas
(74) *Attorney, Agent, or Firm* — Edell, Shapiro & Finnan, LLC

(57) ABSTRACT

Provided are techniques for the efficient distribution of peer zone databases in a FC Fabric. In an example, a switch instantiates a peer zone definition defining a peer zone in which two or more initiator host devices are each permitted to communicate with one or more target storage devices via the switched FC fabric and the two or more initiator host devices are prevented from communicating with each other. The switch stores the peer zone definition in a peer zone database at the FC switch, and distributes the peer zone definition to other FC switches of the switched FC fabric without performing a Fabric lock operation.

20 Claims, 5 Drawing Sheets

(51) Int. Cl.
  *H04L 12/751* (2013.01)
  *H04L 12/28* (2006.01)
  *H04L 29/08* (2006.01)
  *G06F 16/23* (2019.01)

(56) References Cited

U.S. PATENT DOCUMENTS

| | | | |
|---|---|---|---|
| 2011/0103391 A1* | 5/2011 | Davis | H04L 45/60 |
| | | | 370/400 |
| 2014/0351545 A1* | 11/2014 | Nakajima | G06F 3/0607 |
| | | | 711/170 |
| 2017/0048322 A1 | 2/2017 | Desanti | |
| 2018/0219755 A1* | 8/2018 | Agarwal | H04L 43/08 |

OTHER PUBLICATIONS

"Brocade Fabric OS Administration Guide, 7.4.0", 53-1003509-06, Nov. 10, 2016, http://www.brocade.com/content/dam/common/documents/content-types/administration-guide/fos-740-adminguide.pdf, pp. 346-357.

"MDS 9000 Legacy Switch Interop Mode 2", Chapter 7, Cisco MDS 9000 Family Switch-to-Switch Interoperability Configuration Guide, OL-8400-02, 20 pages.

Steve Wilson et al., "Fibre Channel", T11/Project 2204-D/Rev 10.8, INCITS working draft proposed American National Standard for Information Technology, Jul. 17, 2016, 397 pages.

\* cited by examiner

| PEER ZONE SET 310(1) | | | | PEER ZONE SET 310(2) | | | | | |
|---|---|---|---|---|---|---|---|---|---|
| PEER ZONE A 315(1) | | | | PEER ZONE B 315(2) | | | | | |
| PEER ZONE B 315(2) | | | | PEER ZONE C 315(3) | | | | | |
| PEER ZONE C 315(3) | | | | PEER ZONE D 315(4) | | | | | |
| PEER ZONE A 315(1) | PEER ZONE B 315(2) | | | PEER ZONE C 315(3) | PEER ZONE D 315(4) | | | | |
| MEM A 320(1) | MEM E 320(5) | | | MEM A 320(1) | MEM A 320(1) | | | | |
| MEM B 320(2) | MEM F 320(6) | | | MEM C 320(3) | MEM B 320(2) | | | | |
| MEM C 320(3) | MEM G 320(7) | | | MEM H 320(8) | MEM C 320(3) | | | | |
| MEM D 320(4) | | | | | MEM D 320(4) | | | | |
| | | | | | MEM E 320(5) | | | | |
| ATTRIBUTES P 325(1) | ATTRIBUTES Q 325(2) | | | ATTRIBUTES P 325(1) | ATTRIBUTES Q 325(2) | | | | |
| ATTRIBUTES a 330(1) | | | | ATTRIBUTES a 330(1) | | | | | |
| ATTRIBUTES b 330(2) | | | | ATTRIBUTES c 330(3) | | | | | |

EFFICIENT DISTRIBUTION OF PEER ZONE DATABASE IN FIBRE CHANNEL FABRIC

TECHNICAL FIELD

The present disclosure relates to the efficient distribution of peer zone database(s) in a Fibre Channel (FC) fabric.

BACKGROUND

A storage area network (SAN) is used to connect host devices (e.g., servers, computers, etc.) to one or more shared storage devices. Fibre (Fiber) Channel (FC) is a high-speed network technology and protocol suite used to implement SANs. A purpose of the FC protocol suite is to efficiently manage large numbers of storage devices using serial interfaces operating over optical or electrical interfaces. FC provides an efficient and dependable means for transferring data between workstations, mainframes, supercomputers, desktop computers, and storage devices.

The network portion of a SAN based on Fibre Channel is called a FC switched fabric (also referred to herein as a FC Fabric). A FC switched fabric comprises one or more FC switches that are deployed to direct traffic between the host devices and the storage devices. The host devices perform computations and/or provide services, usually through a network connection to a wide area network (WAN) (e.g., the Internet, Intranet, etc.) or a local area network (LAN).

BRIEF DESCRIPTION OF THE DRAWINGS

FIG. 3 is a schematic diagram illustrating the logical structure of a peer zone database, according to an example embodiment.

DESCRIPTION OF EXAMPLE EMBODIMENTS

Overview

Provided are techniques for the efficient distribution of peer zone databases in a FC Fabric. In an example, a switch instantiates a peer zone definition defining a peer zone in which two or more initiator host devices are each permitted to communicate with one or more target storage devices via the switched FC fabric and the two or more initiator host devices are prevented from communicating with each other. The switch stores the peer zone definition in a peer zone database at the FC switch, and distributes the peer zone definition to other FC switches of the switched FC fabric without first performing a Fabric lock operation.

Example Embodiments

Figure 1:
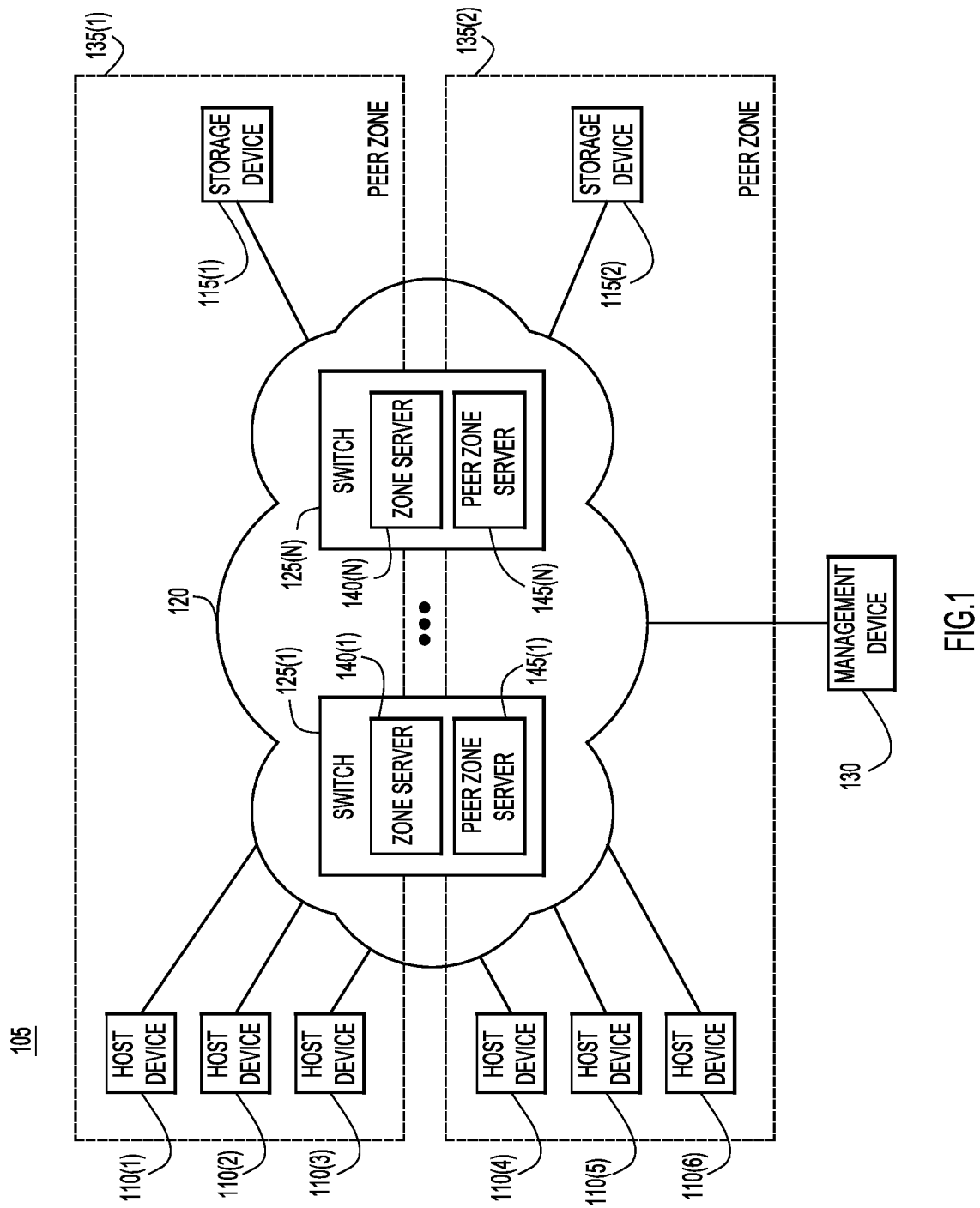
FIG. 1 is a block diagram of a storage area network (SAN) configured to perform database distribution techniques described herein, according to an example embodiment.

FIG. 1 is a block diagram of an example FC storage area network (SAN) that is generally shown at reference numeral 105. FC SAN 105 comprises a plurality of host devices 110(1)-110(6) and two or more storage devices 115(1) and 115(2), connected by an FC switched fabric (referred to herein as "FC Fabric") schematically represented by cloud 120. FC Fabric 120 comprises a plurality of switches 125(1)-125(N). Host devices 110(1)-110(6) are also sometimes referred to herein as "initiators" because they initiate read and/or write transactions with the storage devices 115(1) and/or 115(2). Storage devices 115(1) and 115(2) are also sometimes referred to herein as "targets" because they receive the commands sent from the host devices 110(1)-110(6). Connected to FC Fabric 120 is a management device 130.

It has been determined that a zoning arrangement in which N host devices can only communicate with the storage device, but not with one another, may be beneficial. This type of zoning arrangement is referred to as a "peer zone." FIG. 1 schematically illustrates a first peer zone 135(1) that includes host devices 110(1)-110(3) and storage device 115(1), as well as a second peer zone 135(2) that includes host devices 110(4)-110(6) and storage device 115(2). In peer zone 135(1), the host devices 110(1)-110(3) are "peer" devices that can each communicate with storage device 115(1) (i.e., the FC Fabric 120 allows each of the host devices to initiate read or write transactions with the storage devices 115(1)). However, the FC Fabric 120 is configured so as to prevent the host devices 110(1)-110(3) from communicating with one another (i.e., the peer devices cannot communicate with one another). In peer zone 135(2), each of host devices 110(4)-110(6) again are "peer" devices that can each communicate with storage device 115(2) (i.e., the FC Fabric 120 allows each of the host devices to initiate read or write transactions with the storage devices 115(2)). However, the FC Fabric 120 is configured so as to prevent the host devices 110(1)-110(3) from communicating with one another.

In certain examples, the management device 130 may be a dedicated management console through which a user is able to create the peer zones 135(1)-135(2). In another example, management device 130 is a storage device that pushes peer zones 135(1)-135(2) to switches 125(1)-125(N).

The switches 125(1)-125(N) each include a respective management function referred to as a "zone server" 140(1)-140(N). Management device 130 typically accesses the zone servers 140(1)-140(N) with a protocol known as the Common Transport (CT). That is, using CT, management device 130 is able to access the zone servers 140(1)-140(N) in order to define and manage zones.

Conventionally, zone servers 140(1)-140(N) also perform switch to switch communications to ensure that every other switch of the Fabric has the same zoning information (i.e., the same zone definitions) and, accordingly, ensure consistent Fabric behavior. In conventional arrangements, the zone server of a single switch distributes the zoning information at any given time by initiating a FC Fabric "lock." While the FC Fabric is locked, only the zone server of the switch that initiated the lock can distribute zoning information. A switch may lock the Fabric through, for example, a Server Session Begin (SSB) command (i.e., performs a Fabric locking operation).

In general, the zone server modifies a local copy of a desired zoning configuration (e.g., add zone, remove zone, add zone member, remove zone member, etc.). That is, the Fabric lock is necessary in conventional arrangements to permit the zone server of each switch to consolidate all peer zones locally. The zone server uses, for example, a Commit (CMIT) command to set the current Fabric Zoning configuration to be the same as the determined modified zoning configuration, and then releases the Fabric lock through, for example, a Server Session End (SSE) command (i.e., performs a Fabric unlocking operation). Thus, conventionally, a locking protocol is necessary to modify/update any zone definitions in a Fabric, even though such locking protocols often delay the activation of the zone(s).

The locking protocol typically involves four stages: (1) acquiring the lock from all the switches in the Fabric (e.g., by sending an Acquire Change Authorization (ACA) message); (2) distributing the zone set; (3) making the zone set active; and (4) releasing the acquired lock. This four-stage locking protocol can create a Fabric "dead lock" condition in which switches are unable to lock the Fabric (and therefore cannot, for example, update a zone) for an extended period of time. A dead lock condition may occur when multiple devices connect to different switches in the Fabric at similar times. For example, if two devices simultaneously connect to different switches in the Fabric, both switches might simultaneously attempt to initiate the four-stage locking protocol by sending respective ACA messages to switches in the Fabric, including to each other. In this example, neither switch will successfully acquire the lock. In particular, the first switch will reject the second switch ACA message (e.g., via an RJT message indicating failure) because the first switch ACA message is outstanding. Similarly, the second switch will reject the first switch outstanding ACA message (e.g., via another RJT message) because the second switch ACA message is also outstanding.

Presented herein are techniques that enable peer zones to be activated without first requiring the execution of a Fabric lock operation (i.e., without the need to execute a Fabric-wide lock), thereby avoiding the dead lock issue described above. In other words, the techniques presented herein allow for the continuous operation of the FC Fabric even while peer zoning information is distributed by one or more switches within the FC Fabric. More specifically, in accordance with examples presented herein, the switches 125(1)-125(N) are each configured with a respective additional management function, referred to herein as "peer zone servers" 145(1)-145(N).

The peer zone servers 145(1)-145(N) respectively enable switches 125(1)-125(N) to communicate with each other to share new or modified peer zone definitions without locking the FC Fabric 120. The peer zone definitions are associated with a peer zone name and a unique domain identification (ID) (e.g., a two-tuple domain ID). Because the domain IDs are unique, each switch 125(1)-125(N) may independently distribute peer zone(s) throughout the FC Fabric 120. Thus, for example, switch 125(1) may instantiate a peer zone definition and distribute the peer zone definition to the other switches of the FC Fabric 120 without first performing a Fabric lock operation. In contrast to conventional arrangements, it is unnecessary to lock the FC Fabric 120 to permit each switch 125(1)-125(N) to consolidate peer zones locally. Instead, multiple switches 125(1)-125(N) may distribute respective peer zones simultaneously using unique domain IDs.

Figure 2:
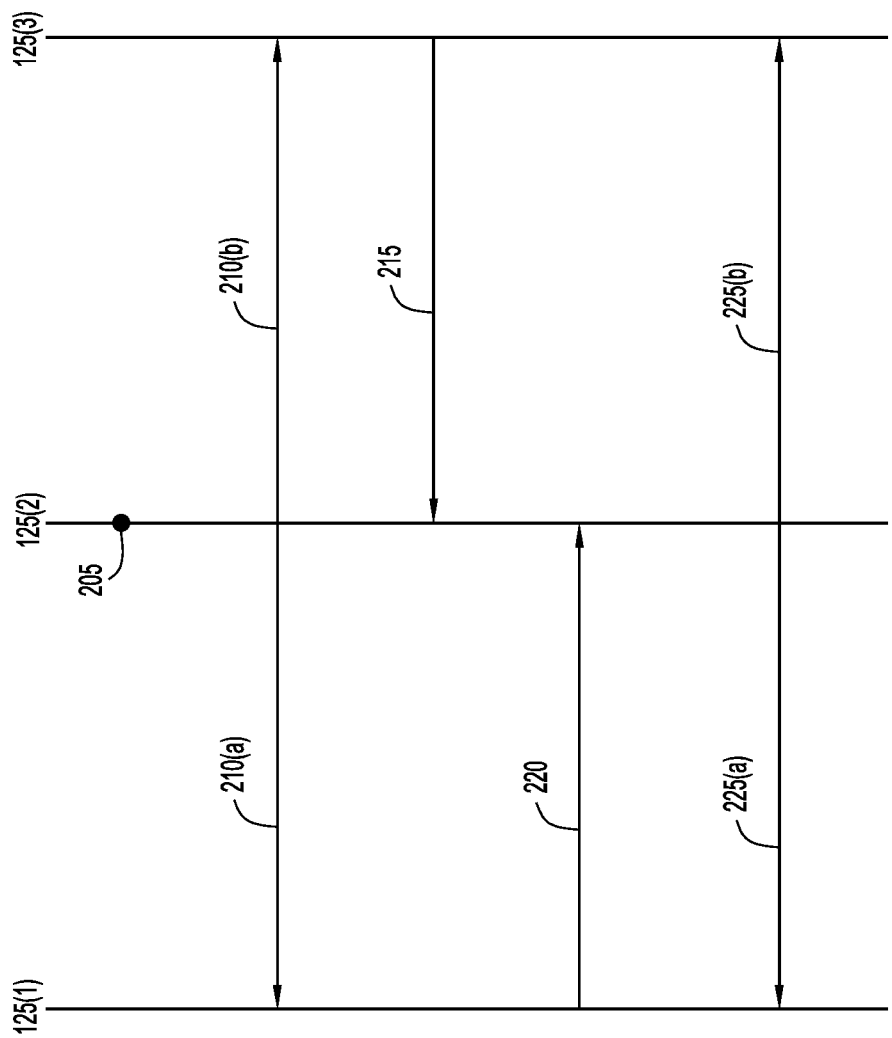
FIG. 2 is a sequence diagram of communications between switches in a Fibre Channel (FC) Fabric, according to an example embodiment.

With reference to FIG. 2, and with continued reference to FIG. 1, shown is a sequence diagram of communications between switches 125(1)-125(3) in FC Fabric 120 in accordance with examples presented herein. At 205, the switch 125(2) receives/generates a peer zone definition from a target storage device (e.g., target storage device 115(1) or 115(2)). The switch 125(2) may store data describing the peer zone definition in a peer zone database, as described in greater detail below in reference to FIG. 3. As explained in greater detail below, in response to storing the peer zone definition, switch 125(2) may begin soft zoning or hard zoning procedures (e.g., beginning a hard zoning injection in hardware).

At arrows 210(a)-210(b), the switch 125(2) distributes the peer zone definition to switches 125(1) and 125(3). As mentioned, the switch 125(2) distributes the peer zone definition without first performing a Fabric lock operation (i.e., while the FC Fabric 120 continues to operate). At arrow 215, switch 125(2) receives a change to its local peer zone database from switch 125(3), and at arrow 220, switch 125(2) receives another change to its local peer zone database from switch 125(1). These changes may be, for example, information pertaining only to the portion of the local peer zone database to be changed/updated. Switch 125(2) updates its peer zone database based on the changes received from switches 125(1) and 125(3) and, at arrows 225(a)-225(b), distributes the updates to switches 125(1) and 125(3). In an example, once switches 125(1)-125(3) instantiate one or more zones according to respective peer zone databases, a peer zone definition in the peer zone database may only be deleted by the target storage device (e.g., storage devices 115(1) and/or 115(2)).

In certain examples, switch 125(2) waits for a period of time (e.g., one minute) after receiving the change(s) before distributing the updates to switches 125(1) and 125(3). For instance, after receiving the change(s) from switch 125(3) (arrow 215), switch 125(2) may wait for a period of time before sending an update to switches 125(1) (arrow 225(a)) and 125(3) (arrow 225(b)). If switch 125(2) receives the change(s) from switch 125(1) (arrow 220) within that period of time, the switch 125(2) may consolidate the changes from switches 125(1) and 125(3) and distributed the consolidated changes/updates to switch 125(1) (arrow 225(a)) and switch 125(3) (arrow 225(b)). This is in contrast to conventional arrangements, in which switch 125(1) would have been unable to send its changes (arrow 220) until after switch 125(3) would have released its acquired lock.

Switch 125(2) may distribute and/or receive peer zone definitions by sending a Fibre Channel CT (FC_CT) query as a domain controller frame that includes the peer zone definition(s). For example, arrows 210(a)-210(b), 215, 220, and 225(a)-225(b) may each represent a separate FC_CT query. Switches (e.g., switch 125(2)) may use FC_CT queries to synchronize newly instantiated zones throughout the FC Fabric 120 (e.g., arrows 225(a)-225(b)). In case a new switch joins the FC Fabric 120, switch 125(2) may send its local peer zone definition(s) to the new switch via an FC_CT query. The new switch may also send its local peer zone definition(s) to switch 125(2) via an FC_CT query.

Switches 125(1)-(3) may be capable of handling certain FC Generic Service (GS) 7 commands that enable the modification of peer zones. The Add/update Active Peer Zone (AAPZ) command provides the function of adding (or updating) a peer zone set in a peer zone database. The Remove Active Peer Zone (RAPZ) command provides the function of removing a peer zone set from a peer zone database. The Get Active Peer Zone (GAPZ) command provides the function of reading the definition of a peer zone set in a peer zone database.

FIG. 3 is a schematic diagram illustrating the logical structure of an example peer zone database 305. Peer zone database 305 includes peer zone sets 310(1)-310(2). Each peer zone set 310(1) and 310(2) is identified by a peer zone set name and contains a list of references to a plurality of peer zone definitions 315(1)-315(4). Each zone definition 315(1)-315(4) is identified by a zone name and includes a list of zone members. For example, zone definition 315(1) includes members 320(1)-320(4), zone definition 315(2) includes members 320(5)-320(7), zone definition 315(3)

includes members 320(1), 320(3), and 320(8), and zone definition 315(4) includes members 320(1)-320(5).

A zone definition may also include a reference to a zone attribute object, defining a list of attributes that can be associated with the zone and that can modify the zone enforcement rules. Zone definitions 315(1) and 315(3) each include attribute object 325(1), while zone definitions 315 (2) and 315(4) each include attribute object 325(2). Attribute object 325(1) includes attributes 330(1)-330(2), and attribute object 325(2) includes attributes 330(1) and 330(3). Zone attributes are used to specify additional characteristics of a zone that provide additional behaviors. Zone attributes may provide additional parameters, including a protocol attribute, used to restrict the zone to a certain protocol (specified as a parameter of the attribute), hard zone attribute, used to specify frame by frame enforcement (without parameter), broadcast zone attribute, used to specify additional constraints on broadcast frames processing (without parameter), and Inter-Fabric zone (IFR) zone, used to identify an Inter-Fabric zone (without parameter).

A peer zone is defined through the definition of a peer zone attribute. The peer zone definition identifies a principal member (i.e., the target storage device), specified as a parameter of the peer zone attribute, and a list of peer members (i.e., initiator host devices) as zone members. As noted above, peer members are allowed to communicate with the principal member, and the peer members are not allowed to communicate among themselves (unless allowed by other zones in the active peer zone set).

A switch may store a peer zone definition/information in peer zone database 305 by indexing the principal and/or peer members by respective port world wide names (PWWNs). A PWWN is a permanent identifier of a device and does not change when a device goes offline. For example, if a host device having a PWWN goes offline, the host device will have the same PWWN when the host device later comes back online. It will be appreciated that the switch may also index the principal and/or peer members by any suitable identification, such as FC identification (FCID). Unlike the PWWN, the FCID changes when a device goes offline.

As briefly mentioned above, a switch may implement hard zoning or soft zoning techniques to enforce one or more peer zone definitions in a FC Fabric. With respect to hard zoning, the peer zone server updates an access control list (ACL) based on a peer zone database to prevent an initiator host device that is not permitted to access another initiator host device from accessing the other initiator host device. The peer zone server may program the ACL in hardware content-addressable memory (CAM). A switch may include both a zone server database and a peer zone database, and either/both may program ACL entries independently.

With respect to soft zoning, a switch may receive, from an initiator host device, a name server query. For example, the name server query may be for the location of another initiator host device (i.e., to enable communication between the initiator host device and the other initiator host device). The switch may determine whether the initiator host device is permitted to communicate with the other initiator host device (e.g., by consulting with a name server database). If the switch determines that the initiator host device is permitted to communicate with the other initiator host device, the switch may provide the initiator host device with information in response to the name server query. However, if the switch determines that the initiator host device is not permitted to communicate with the other initiator host device, the switch may decline to provide the initiator host device with information in response to the name server query. The switch may consult the name server database and a peer zone database before determining whether/how to respond to the name server query. The switch may also consult a zone server database, which may store zone sets that are not peer zone sets (i.e., zone sets that are not obtained in accordance with the techniques described herein).

The following description includes example use cases for distributing a peer zone database in a FC Fabric without locking the Fabric. While these examples are directed to hard zoning techniques, soft zoning techniques may also be implemented in accordance with these examples.

As mentioned, peer zone definitions are associated with a peer zone name and a unique domain ID. In addition, a switch storing a peer zone may receive a new/updated peer zone. In one example, where the switch receives, from a local target storage device, a peer zone that is an exact duplicate of the stored peer zone, the switch may ignore/eliminate any duplicate received peer zones.

If the zone names of the peer zones are different but the zone members of the peer zones are identical, the switch may prepare ACLs using both peer zones. This will result in duplicate ACLs because the zone members are identical, but the switch may ignore duplicate ACLs and program only unique ACLs into the CAM. Similarly, if the zone names and zone members are identical, the switch may prepare ACLs using both peer zones. While this will result in duplicate ACLs, the switch may program only unique ACLs into the CAM (i.e., ignoring duplicate ACLs). In addition, the switch may delete peer zones that are not associated with domains where the target storage device is connected.

In certain situations, both the zone names and the zone members may be different, but the target storage device issuing the peer zone may be the same. This may occur when, for example, a user brings the target storage device offline, edits the zone members, and attaches the target storage device to a different switch of the Fabric. In these situations, the switch may determine which peer zone (e.g., the stored peer zone) is associated with a target storage device that is offline. The switch may make this determination based on, for example, the FCID of the target storage device since the FCID changes when a device goes offline. The switch may delete the stored peer zone associated with the offline target storage device and add the received peer zone.

In another example, the zone names may be identical but the zone members different. This situation may occur when a user removes a target storage device from a switch and attaches the target storage device to another switch of the Fabric. When the switch receives the peer zone from the target storage device, the switch identifies the peer zone that is associated with a target storage device that is offline (e.g., based on the FCID) and deletes that peer zone. This situation may also occur when a user misconfigures two (online) target storage devices such that the target storage devices send peer zones having the same name but different zone members. The switch may correct for this administrative error by preparing ACLs for both peer zones. As described above, the switch may ignore duplicate ACLs when programming the CAM.

Figure 4:
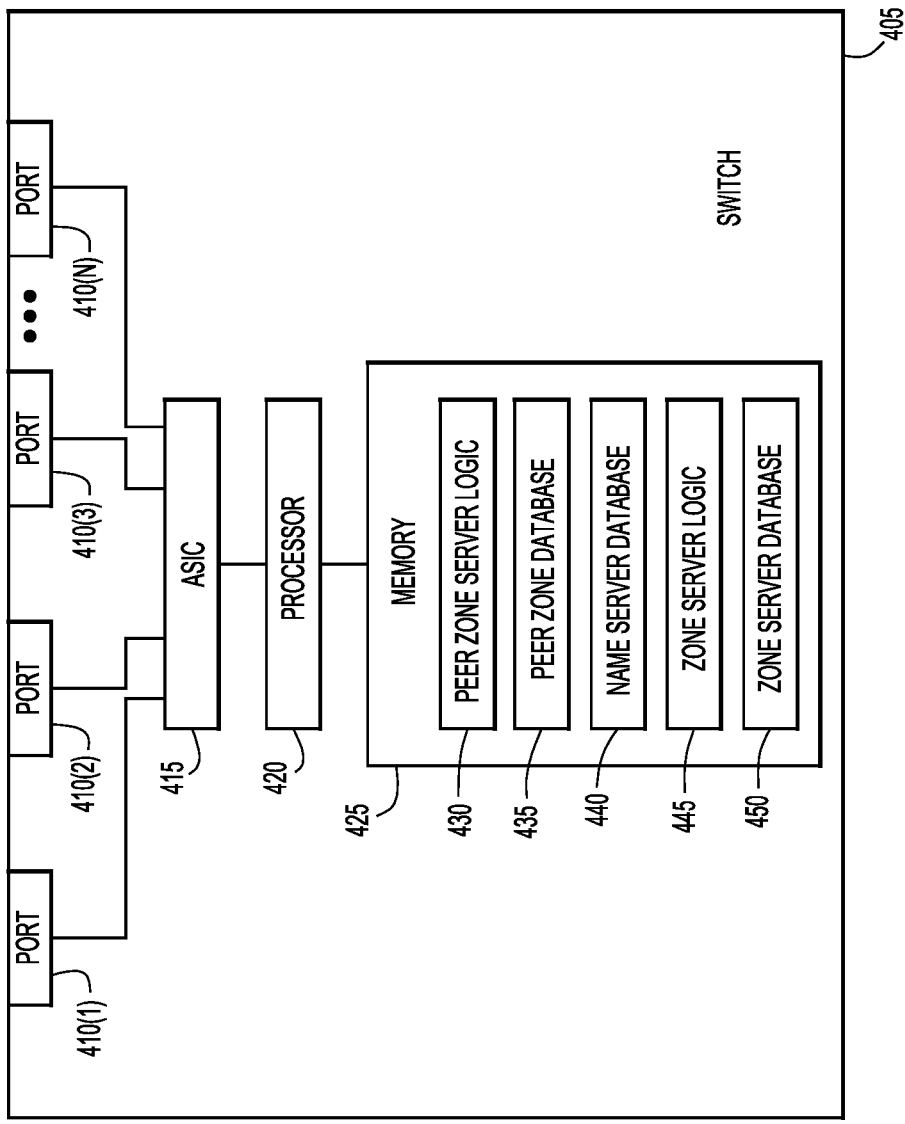
FIG. 4 is a block diagram of a switch configured to execute database distribution techniques, according to an example embodiment.

FIG. 4 is a block diagram of a switch 405 (e.g., switch 125(1) in FIG. 1) that is configured to implement the techniques presented herein. The switch 405 includes a network interface unit in the form of a plurality of network ports 410(1)-410(N) that enable communications over a network, an Application Specific Integrated Circuit (ASIC) 415 that performs network processing functions, one or more processors 420 (e.g., microprocessors or microcontrollers), and a memory 425. The memory 425 includes peer zone server logic 430, peer zone database 435 (e.g., peer zone database 305 in FIG. 3), name server database 440, zone server logic 445, and zone server database 450.

The memory 425 may include read only memory (ROM), random access memory (RAM), magnetic disk storage media devices, optical storage media devices, flash memory devices, electrical, optical, or other physical/tangible memory storage devices. Thus, in general, the memory 425 may comprise one or more tangible (non-transitory) computer readable storage media (e.g., a memory device) encoded with software comprising computer executable instructions and when the software is executed (e.g., by the one or more processors 420) it is operable to perform the operations described herein with reference to peer zone database distribution. In particular, as noted, the memory 425 includes peer zone server logic 430 that, when executed, enables the switch 405 to perform the operations described above with reference to a peer zone server (e.g., peer zone server 130(1) in FIG. 1).

As mentioned, a switch may distribute changes/updates to a peer zone database (as opposed to an entire peer zone database). In certain conventional approaches, the CAM is recalculated for the entire zone database every time a new peer zone is created, which is a central-processing unit (CPU)-intense operation. By contrast, these techniques may involve modifying and programming the exact CAM entries.

These techniques also provide other benefits, such as allowing for uninterrupted user- and target-configured zones. Convergence time for these zone is quick because there is no four-stage locking protocol. In addition, these techniques seamlessly resolve most merge conflicts and require minimal control traffic exchange. Also, zone scaling limits have no bearing on these target-driven zones. Further, the peer zone server may handle simultaneous updates from devices as well as user interfaces.

Figure 5:
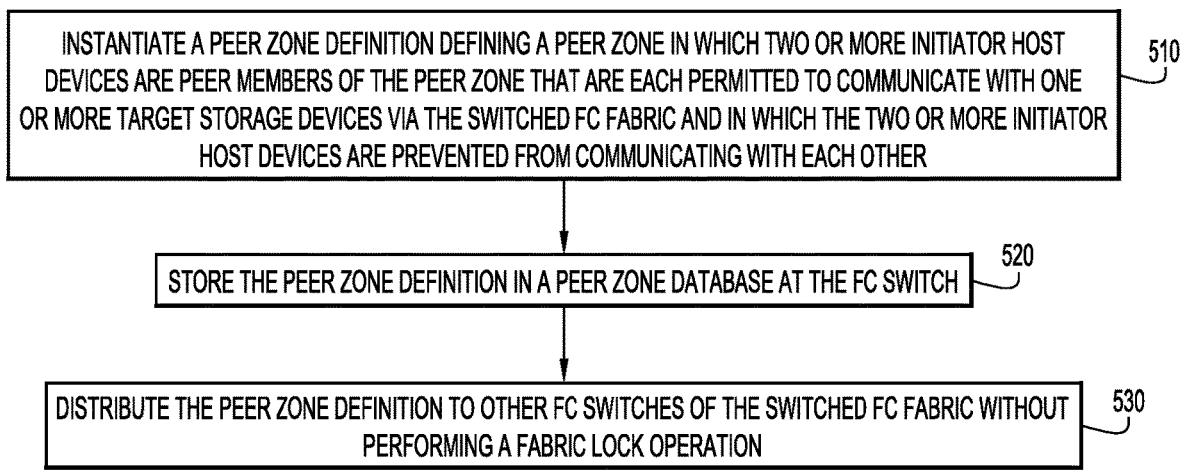
FIG. 5 is a high-level flowchart of a method in accordance with examples presented herein.

FIG. 5 is a flowchart of a high-level method in accordance with examples presented herein. This example method occurs at a FC switch forming part of a switched FC fabric. At 510, the FC switch instantiates a peer zone definition defining a peer zone in which two or more initiator host devices are each permitted to communicate with a target storage device via the switched FC fabric and the two or more initiator host devices are prevented from communicating with each other. At 520, the FC switch stores the peer zone definition in a peer zone database at the FC switch. At 530, the FC switch distributes the peer zone definition to other FC switches of the switched FC fabric without performing a Fabric lock operation (i.e., while the switched FC Fabric continues to operate).

In one form, a method is provided. The method comprises: at a Fibre Channel (FC) switch forming part of a switched FC fabric: instantiating a peer zone definition defining a peer zone in which two or more initiator host devices are peer members of the peer zone that are each permitted to communicate with one or more target storage devices via the switched FC fabric and in which the two or more initiator host devices are prevented from communicating with each other; storing the peer zone definition in a peer zone database at the FC switch; and distributing the peer zone definition to other FC switches of the switched FC fabric without performing a Fabric lock operation.

In another form, an apparatus is provided. The apparatus comprises: one or more processors; one or more network ports; and a memory coupled to the one or more processors; wherein the one or more processors are configured to: instantiate a peer zone definition defining a peer zone in which two or more initiator host devices are peer members of the peer zone that are each permitted to communicate with one or more target storage devices via the switched FC fabric and in which the two or more initiator host devices are prevented from communicating with each other; store the peer zone definition in a peer zone database at the FC switch; and distribute the peer zone definition to other FC switches of the switched FC fabric without performing a Fabric lock operation.

In another form, one or more non-transitory computer readable storage media are provided. The non-transitory computer readable storage media are encoded with instructions that, when executed by a processor, cause the processor to: instantiate a peer zone definition defining a peer zone in which two or more initiator host devices are peer members of the peer zone that are each permitted to communicate with one or more target storage devices via the switched FC fabric and in which the two or more initiator host devices are prevented from communicating with each other; store the peer zone definition in a peer zone database at the FC switch; and distribute the peer zone definition to other FC switches of the switched FC fabric without performing a Fabric lock operation.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a Fibre Channel (FC) switch forming part of a switched FC fabric:
   instantiating a peer zone definition defining a peer zone in which two or more initiator host devices are peer members of the peer zone that are each permitted to communicate with one or more target storage devices via the switched FC fabric and in which the two or more initiator host devices are prevented from communicating with each other;
   storing the peer zone definition in a peer zone database at the FC switch;
   updating an access control list based on the peer zone definition;
   preventing an initiator host device that is not one of the two or more initiator host devices from accessing the two or more initiator host devices; and
   using a unique domain identification associated with the peer zone definition, distributing the peer zone definition to other FC switches of the switched FC fabric without performing a Fabric lock operation.

2. The method of claim 1, further comprising:
   receiving the peer zone definition from at least one of the one or more target storage devices.

3. The method of claim 1, further comprising:
   receiving one or more changes to the peer zone definition stored in the peer zone database at the FC switch;
   updating the peer zone database based on the one or more changes to include an updated peer zone definition; and
   distributing the updated peer zone definition to the other FC switches of the switched FC fabric.

4. The method of claim 1, wherein storing the peer zone definition in the peer zone database includes:
   indexing the two or more initiator host devices and the one or more target storage devices by respective port world wide names.

5. The method of claim 1, wherein distributing the peer zone definition includes sending a FC common transport query as a domain controller frame that includes the peer zone definition.

6. The method of claim 1, further comprising:
receiving a name server query regarding at least one of the two or more initiator host devices;
determining that the name server query was received from one of the two or more initiator host devices; and
in response to determining that the name server query was received from the one of the two or more initiator host devices, declining to provide the one of the two or more initiator host devices with information in response to the name server query.

7. An apparatus comprising:
one or more processors;
one or more network ports; and
a memory coupled to the one or more processors;
wherein the one or more processors are configured to:
instantiate a peer zone definition defining a peer zone in which two or more initiator host devices are peer members of the peer zone that are each permitted to communicate with one or more target storage devices via a switched Fibre Channel (FC) fabric and in which the two or more initiator host devices are prevented from communicating with each other;
store the peer zone definition in a peer zone database in the memory;
update an access control list based on the peer zone definition;
prevent an initiator host device that is not one of the two or more initiator host devices from accessing the two or more initiator host devices; and
using a unique domain identification associated with the peer zone definition, distribute the peer zone definition to other FC switches of the switched FC fabric without performing a Fabric lock operation.

8. The apparatus of claim 7, wherein the one or more processors are further configured to:
receive the peer zone definition from at least one of the one or more target storage devices.

9. The apparatus of claim 7, wherein the one or more processors are further configured to:
receive one or more changes to the peer zone definition stored in the peer zone database in the memory;
update the peer zone database based on the one or more changes to include an updated peer zone definition; and
distribute the updated peer zone definition to the other FC switches of the switched FC fabric.

10. The apparatus of claim 7, wherein to store the peer zone definition in the peer zone database the one or more processors are configured to:
index the two or more initiator host devices and the one or more target storage devices by respective port world wide names.

11. The apparatus of claim 7, wherein to distribute the peer zone definition, the one or more processors are configured to:
send a FC common transport query as a domain controller frame that includes the peer zone definition.

12. The apparatus of claim 7, wherein the one or more processors are further configured to:
receive a name server query regarding at least one of the two or more initiator host devices;
determine that the name server query was received from one of the two or more initiator host devices; and
in response to determining that the name server query was received from the one of the two or more initiator host devices, decline to provide the one of the two or more initiator host devices with information in response to the name server query.

13. One or more non-transitory computer readable storage media encoded with instructions that, when executed by a processor, cause the processor to:
instantiate a peer zone definition defining a peer zone in which two or more initiator host devices are peer members of the peer zone that are each permitted to communicate with one or more target storage devices via a switched Fibre Channel (FC) fabric and in which the two or more initiator host devices are prevented from communicating with each other;
store the peer zone definition in a peer zone database at a FC switch;
update an access control list based on the peer zone definition;
prevent an initiator host device that is not one of the two or more initiator host devices from accessing the two or more initiator host devices; and
using a unique domain identification associated with the peer zone definition, distribute the peer zone definition to other FC switches of the switched FC fabric without performing a Fabric lock operation.

14. The one or more non-transitory computer readable storage media of claim 13, wherein the instructions further cause the processor to:
receive the peer zone definition from at least one of the one or more target storage devices.

15. The one or more non-transitory computer readable storage media of claim 13, wherein the instructions further cause the processor to:
receive one or more changes to the peer zone definition stored in the peer zone database at the FC switch;
update the peer zone database based on the one or more changes to include an updated peer zone definition; and
distribute the updated peer zone definition to the other FC switches of the switched FC fabric.

16. The one or more non-transitory computer readable storage media of claim 13, wherein the instructions that cause the processor to store the peer zone definition in the peer zone database include instructions that cause the processor to:
index the two or more initiator host devices and the one or more target storage devices by respective port world wide names.

17. The one or more non-transitory computer readable storage media of claim 13, wherein the instructions that cause the processor to distribute the peer zone definition in the peer zone database include instructions that cause the processor to:
send a FC common transport query as a domain controller frame that includes the peer zone definition.

18. The method of claim 1, wherein the unique domain identification is a unique two-tuple domain identification.

19. The apparatus of claim 7, wherein the unique domain identification is a unique two-tuple domain identification.

20. The one or more non-transitory computer readable storage media of claim 13, wherein the unique domain identification is a unique two-tuple domain identification.

* * * * *